Nov. 29, 1966  J. LEWIS  3,288,516
CONVERTIBLE VEHICLE TRAILER
Filed April 7, 1964  4 Sheets-Sheet 3
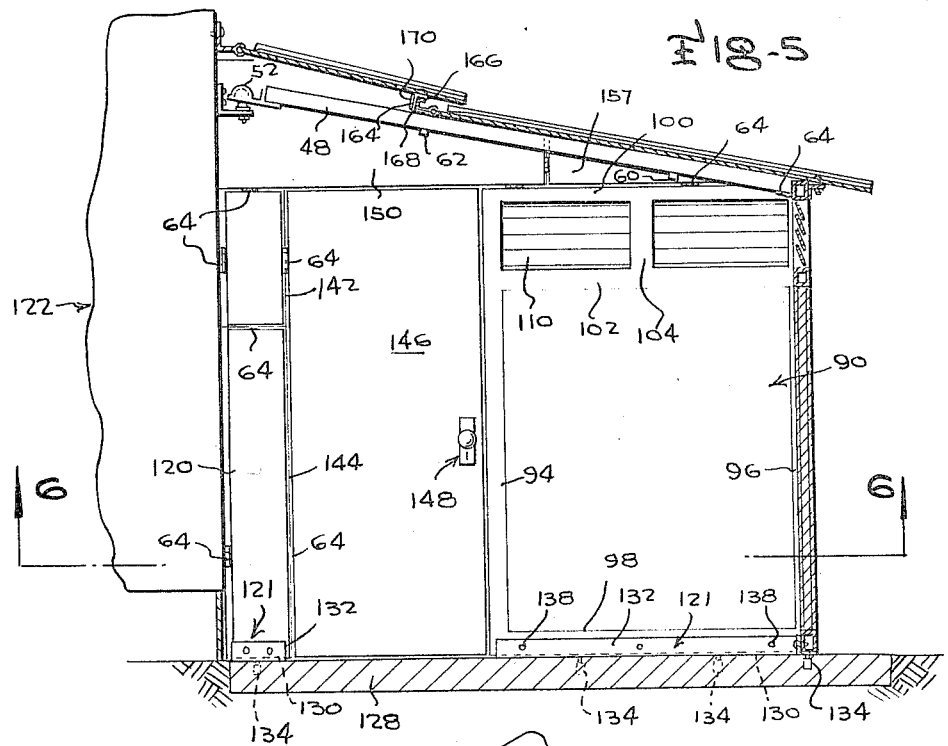
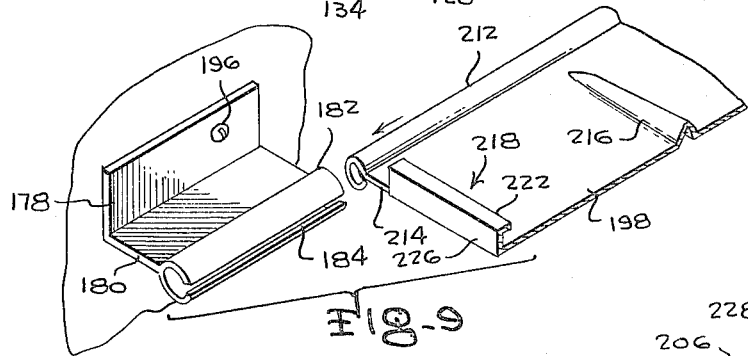
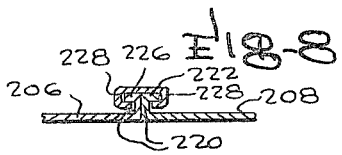
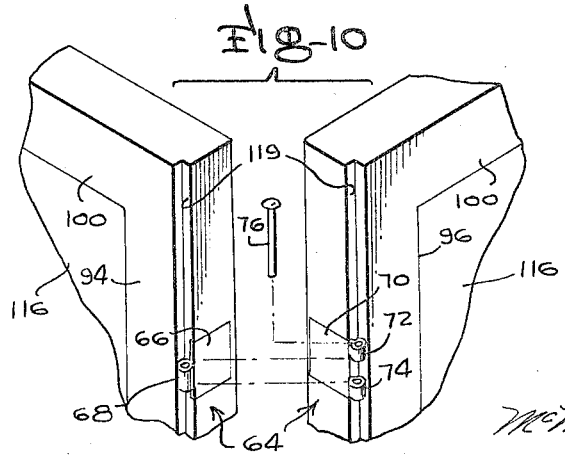
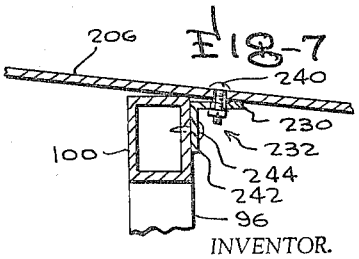
INVENTOR.
JOSEPH LEWIS
BY
McMorrow, Berman & Davidson
ATTORNEYS

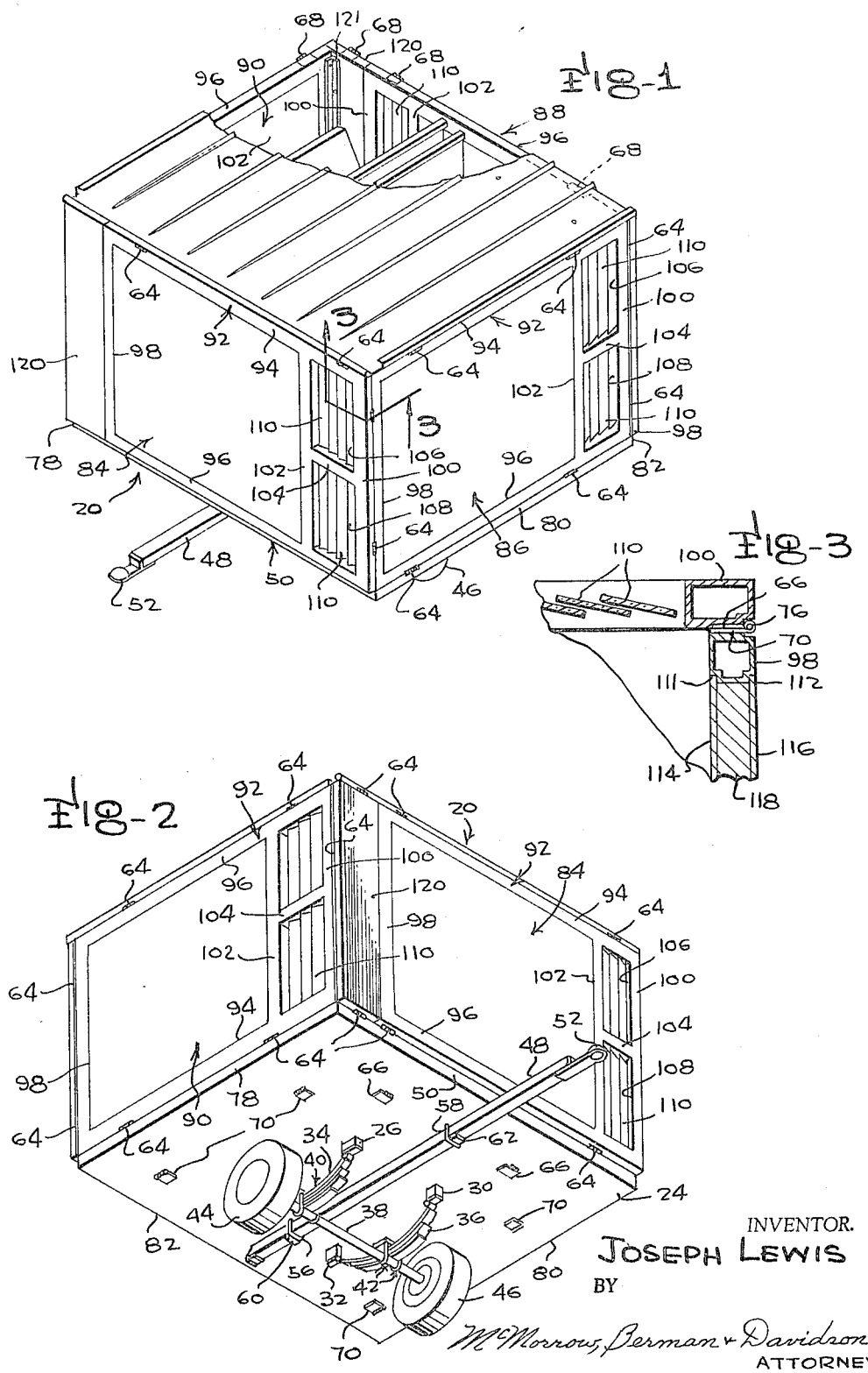

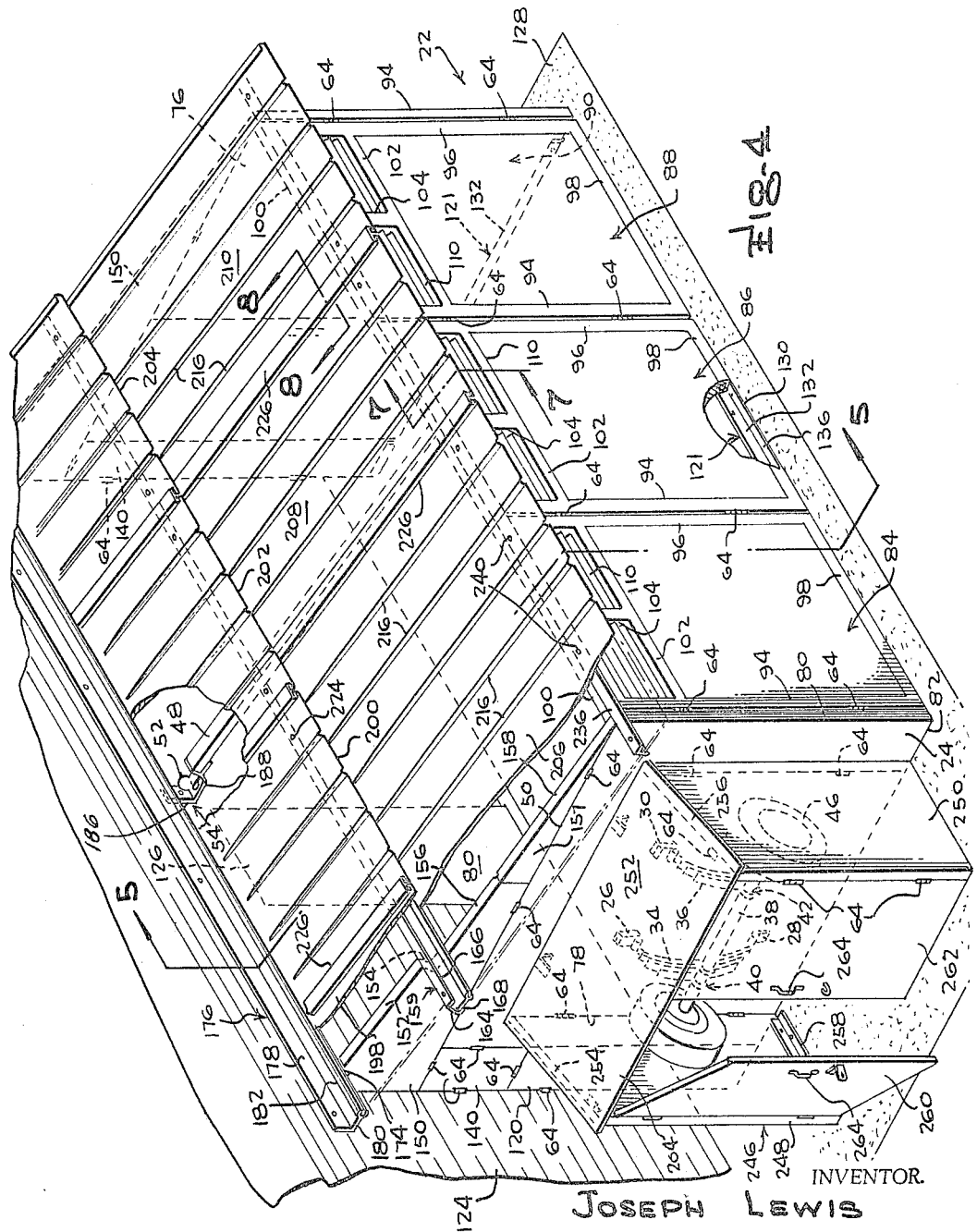

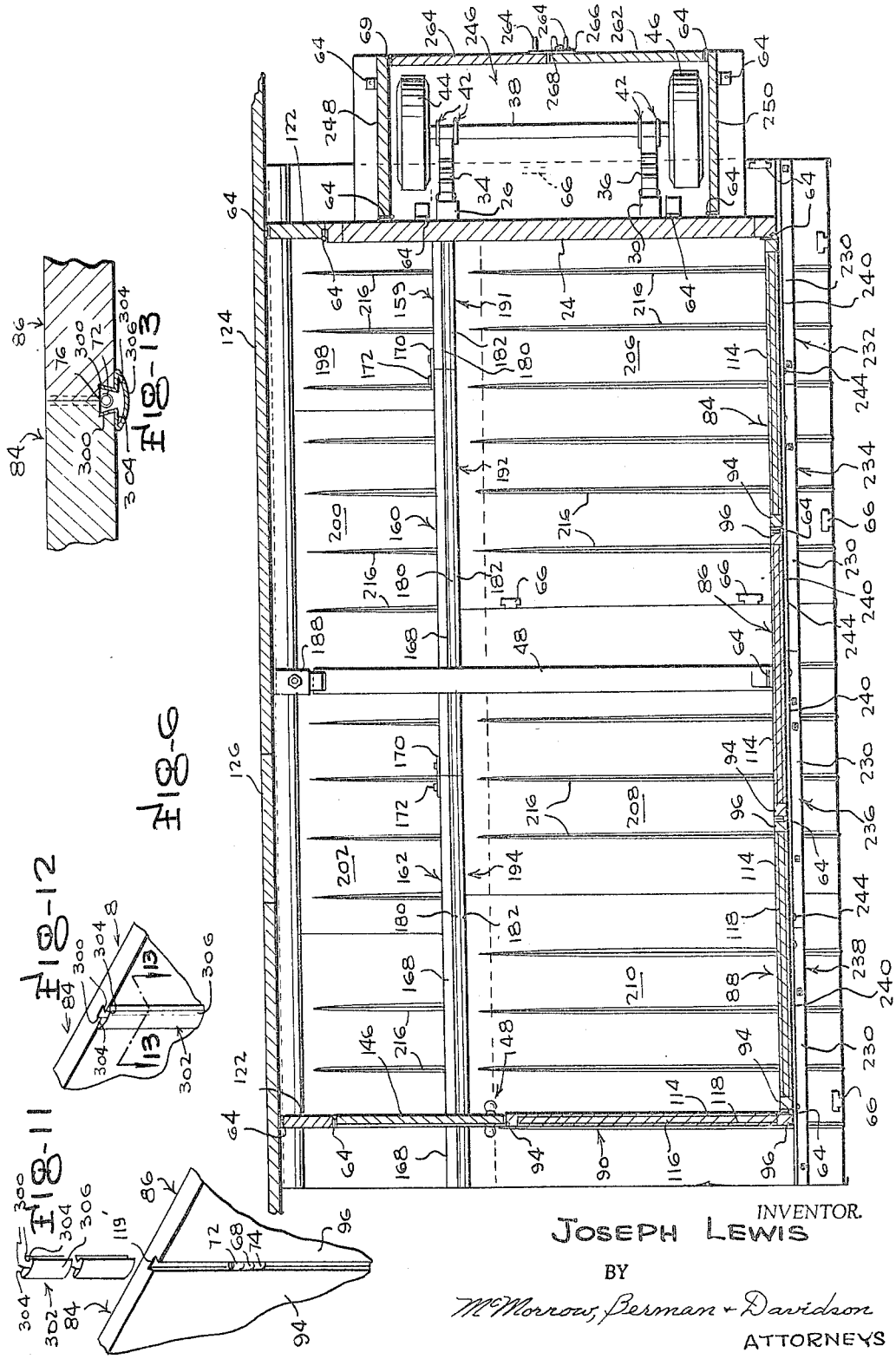

United States Patent Office 3,288,516
Patented Nov. 29, 1966

3,288,516
CONVERTIBLE VEHICLE TRAILER
Joseph Lewis, 10380 SW. 38 Terrace, Miami, Fla.
Filed Apr. 7, 1964, Ser. No. 358,035
13 Claims. (Cl. 296—23)

This invention relates to the general field of wheeled vehicles, and more specifically, the instant invention relates to a vehicle trailer which comprises a unit that is designed to be towed behind a house trailer along a highway and which is possible for conversion to provide auxiliary living space.

It is a well-known fact that more-and-more people have taken to living in a mobile home or house trailer which, for obvious reasons, is provided with limited living areas. Persons living in such accommodations frequently add a cabana or "Florida" room which is connected with the house trailer in order to provide additional living areas or space. However, such cabanas or "Florida" rooms are generally of either a permanent or semi-permant nature and for those persons who travel a great deal, great expense and trouble is incurred to move both the house trailer and the cabana. For example, when moving a ten foot wide trailer it is usually necessary to have it moved by a professional mover at considerable expense. Additionally, if a cabana room has been added, it, too, must be dismantled, moved, and re-assembled at the next trailer parking facility and this also involves considerable expense, especially when one takes into consideration that it usually requires a relatively large truck to haul the parts of a regular cabana or "Florida" room. It is the general opinion among people who move about the country and who make their homes either temporarily or permanently in house trailers that too much trouble and expense are incurred to move both the mobile home and cabana room. Migratory workers and vacationing persons frequently have a family and most states have laws which regulate not only the width of a house trailer, but also the length thereof. Thus, living quarters become quite cramped and are frequently inadequate to serve the intended purpose. Obviously, a large trailer would answer some of the required space needs, but, as has been mentioned above, certain states having regulatory laws concerning the length and width of house trailers prohibit the expansion of such mobile homes.

The answer to this problem is, of course, the addition of a cabana room, but in most instances there is resistance to the erection of same due to not only the expense of building and buying the materials for such a room, but also the great expenses which are involved in dismantling, shipping and re-erecting such a room when the next temporary or permanent trailer site has been selected.

It is, therefore, one of the primary objects of this invention to provide a utility trailer which may be pulled by a car or by the house trailer with no great difficulty and which is, at the same time, convertible into a cabana which may be assembled and disassembled with the loss of minimal time.

A further object of this invention is to provide a utility trailer which may be converted into a cabana or "Florida" room wherein a minimum amount of hardware and connecting elements are employed in order to facilitate the assembly and dismantling thereof.

A still further object of this invention is to provide for a house trailer a cabana room, wherein the bed or floor of a utility trailer may be conveniently employed as a part of a wall of the cabana or "Florida" room.

Still another object of this invention is to provide a utility trailer which is readily convertible into a cabana or "Florida" room, the cabana or "Florida" room being constructed of a minimum number of elements most of which form the bed or floor of the utility trailer, the sidewalls thereof and a roof therefor.

This invention contemplates, as a still further object thereof, the provision of a utility trailer which is convertible into a cabana or "Florida" room, the trailer being non-complex in construction and assembly, inexpensive to manufacture and maintain, and which is durable in use.

Other and further objects and advantages of the instant invention will become more evident from a consideration of the following specification when read in conjunction with the annexed drawings, in which:

FIGURE 1 is a perspective view of a utility trailer, partly broken away, the trailer being constructed in accordance with this invention;

FIGURE 2 is a bottom perspective view of the trailer shown in FIGURE 1;

FIGURE 3 is an enlarged fragmentary, detail cross-sectional view, FIGURE 3 being taken substantially on the horizontal plane of line 3—3 of FIGURE 1, looking in the direction of the arrows;

FIGURE 4 is a perspective view of a cabana or "Florida" room constructed from the component elements of the utility trailer shown in FIGURES 1 and 3;

FIGURE 5 is a detail cross-sectional view of the cabana or "Florida" room shown in FIGURE 4, FIGURE 5 being taken substantially on the vertical plane of line 5—5 of FIGURE 4, looking in the direction of the arrows;

FIGURE 6 is a detail cross-sectional view, FIGURE 6 being taken on the horizontal plane of line 6—6 of FIGURE 5, looking in the direction of the arrows;

FIGURE 7 is an enlarged fragmentary, detail cross-sectional view, FIGURE 7 being taken substantially on the vertical plane of line 7—7 of FIGURE 4, looking in the direction of the arrows;

FIGURE 8 is an enlarged fragmentary, detail cross-sectional view, FIGURE 8 being taken substantially on the vertical plane of line 8—8 of FIGURE 4, looking in the direction of the arrows;

FIGURE 9 is an exploded fragmentary, perspective view illustrating the sliding connection between the upper roof section of the cabana and a fixed bracket on the house trailer;

FIGURE 10 is an exploded fragmentary, perspective view illustrating the hinge-type connection which is employed substantially throughout the several component elements of both the utility trailer and the cabana.

FIGURE 11 is a fragmentary and exploded perspective view of a pair of abutting panels together with their associated hinge connectors, and a cover or trim strip for the connectors;

FIGURE 12 is a fragmentary perspective view showing the cover or trim strip in its operative position; and FIGURE 13 is an enlarged detail cross-sectional view, FIGURE 13 being taken substantially on the horizontal plane of line 13—13 of FIGURE 12, looking in the direction of the arrows.

Referring now more specifically to the drawings, reference numeral 20 denotes a utility trailer convertible into a cabana or "Florida" room constructed in accordance with the teachings of this invention. As is shown in FIGURES 1 to 3, inclusive, the utility trailer 20 is adapted for conversion into a cabana or "Florida" room, as is shown in FIGURE 4, and is generally designated by the reference numeral 22.

Making specific reference to the construction of the utility trailer 20, illustrated in FIGURES 1 to 3, inclusive, it is seen that the same comprises an elongated substantially rectangular bed 24 which is somewhat wider than the same is long. Reference numerals 26, 28 and 30, 32 (see FIGURES 2 and 4) denote, respectively, pairs of mounting blocks which have secured thereto the remotely-disposed ends of a pair of conventional leaf spring wheel suspension systems 34, 36 to which is connected a transversely-extending axle 38 intermediate its ends, as by the usual U-shaped shackle bolt assemblies 40, 42, respectively. Mounted on the remotely-disposed ends of the axle 38 in the usual manner for rotation thereon are a pair of conventional trailer wheels 44, 46, respectively.

Extending transversely and centrally of the bed 24 intermediate the wheels 44, 46 is an elongated substantially rectangular draw tongue 48 which projects beyond the forward side 50 of the bed 24 and terminates in a female coupler element 52 of a trailer hitch designated, generally, by reference numeral 54. The complete hitch is not shown in FIGURES 1 to 3, inclusive, but a similar hitch is shown in FIGURE 4. The male portion of the hitch 54 is adapted for connection to the rear end of a conventional house trailer to which further reference will be made. The tongue 48 is secured to the underside of the bed 24 as by a pair of conventional U-shaped bolts 56, 58. Abutting against the remotely-disposed sides of the bolts 56, 58 are a pair of stop lugs 60, 62, respectively, fixedly secured to the tongue 48 in longitudinally-spaced relation, which are adapted to engage against the bolts 56, 58 to prevent transverse shifting of the tongue 48 relative to the bed 24.

Referring now to FIGURE 10, reference numeral 64 designates, in general, detachable connector means, of conventional design, which find frequent application in this invention. The connector means 64 comprises three pieces, namely, a substantially rectangular plate 66 from a side of which projects a centrally-located first hollow tubular barrel 68 forming the male connector element, a second substantially rectangular plate 70 from a side of which project a pair of spaced and aligned hollow tubular barrels 72, 74 forming the female connector element, and a headed lock pin 76. The two plates 66, 70 may be detachably connected together by inserting the barrel 68 between the barrels 72, 74 in the co-axial alignment therewith after which the pin 76 is inserted therethrough.

Again referring to FIGURE 2, it is seen that a pair of the plates 70 are fixedly secured to the underside of the bed 24 spaced from, but proximate the opposed ends 78, 80, thereof, and that one plate of each pair is located adjacent the rear side 82. The distribution of these plates is such that if lines were drawn between each adjacent pair thereof the same would define a rectangle.

A pair of plates 66 are secured to the underside of the bed 24 spaced from, but adjacent to the front end 50.

The purpose and function of the plates 66, 70 as applied to the underside of the bed 24 will be made apparent as this specification progresses.

Reference numerals 84, 86, 88, 90 denote four identically constructed panels having an elongated substantially rectangular configuration. The panels 84, 86, 88, 90 are purposely made identical in order to be interchangeable, one with the others to serve purposes to be described.

Since each of the panels 84, 86, 88, 90 is identical, a description of one will suffice as a description of the others. Hence, and with specific reference to panel 84, each of the panels is seen to comprise a substantially hollow open tubular frame 92 formed of a pair of elongated substantially parallel laterally-spaced side frame members 94, 96 having first and second pairs of adjacent ends connected together by means of a pair of longitudinally-spaced and parallel end frame members 98, 100, respectively.

Spaced inwardly from the end frame member 100 in spaced parallel relation relative thereto is a hollow tubular cross-frame member 102 which extends transversely across the panel 84 and has its opposed ends fixedly secured to the side frame members 94, 96. Reference numeral 104 denotes a substantially hollow tubular divider panel centrally positioned relative to the end frame member 100 and the cross-frame member 102 and extends perpendicular with respect thereto, and is parallel to and is laterally spaced from confronting portions of the side frame members 94, 96. As is seen in the drawings, the divider panel 104 divides one end of the panel 84 into two laterally spaced elongated substantially rectangular windows or openings 106, 108 across which extend a plurality of elongated substantially rectangular louvers, 110, of conventional construction, which may be fixed or adjustable, as desired.

The side frame members 98, 100, the end frame member 96, and the cross-frame member 102 are formed with laterally spaced continuous inner and outer continuous grooves 111, 112, respectively, in which are set and secured by conventional means not shown, a pair of laterally spaced and substantially parallel inner and outer elongated rectangular panels 114, 116, respectively, of which the former may be made of wood or similar materials, and the latter is preferably formed of aluminum. The space between the panels 114, 116 (see FIGURE 3) is preferably filled with a heat-insulating material 118.

To serve a function to be described, one of the corners of the side frame members 94, 96 and the end frame members 98, 100 is formed with a continuous rabbet 119 (see FIGURE 10).

Again referring to FIGURES 1 and 2, reference numerals 120 denote one of a pair of elongated substantially rectangular filler blocks, the utility of which will be set forth below, and these blocks are also interchangeable.

A plurality of detachable connectors 64 serve to connect the side frame members 96 of the panels 84, 86 with the upper side of the bed 24 adjacent the marginal edges thereof at its front side 50 and its end 80. Similar connectors 64 connect the side members 94 of the panels 88, 90 to the bed 24 adjacent the marginal edges thereof at its rear side 82 and end 78. In order that the above referred to interchangeability of the panels be accomplished, it is necessary that the side frame members 94 and 96 be provided with either the male connector elements 68 or the female connector elements 72, 74, respectively, to facilitate the construction of either the utility trailer 20 or that of the cabana or "Florida" room 22. Thus, and as is shown in FIGURE 1, if the side frame members 96 have secured thereto the male connector elements 68, the side frame members 94 will have affixed thereto the female connector elements 72, 74 corresponding in number to the number of male connector elements 68. The same is true of the connector elements connected to the end frame members 98, 100, that is, if male connector elements are secured to the end frame member 98, then the end frame member 100 will be equipped with the same number of female connector elements 72, 74. The same is true in connection with the bed 24. Since the side frame members 96 of the panels 84, 86 carry the male connector elements 68, then the bed 24 must be equipped with female connector elements 72, 74 adjacent its front side 50 and end 80. It follows, then, that the rear side 82 and end 78 must carry male connector elements 68. The same association of connector elements applies with respect to the upper and lower ends of the filler blocks 120 as well as to the sides thereof.

Again referring to FIGURES 1 and 2, it is seen that the end frame member 100 of the panel 84 and the end frame member 98 of the panel 86 are connected together by connector means 64, and that the end frame member 100 of the panel 86 is similarly connected to the end frame member 98 of the panel 88.

The length of the panels 86, 90 is exactly the length of the sides 78, 80, of the bed 24, and since the width of the bed 24 is greater than its length, the space between the adjacent ends 100 and 98 of the panels 88, 90, respectively, is filled in by one of the filler blocks 120, and the space between the adjacent ends 100 and 98 of the panels 90 and 84 is occupied by the other of the filler blocks 120. As is seen in the drawings, connector means 64 serve to connect the filler blocks 120 with adjacent ends of the panels 84, 88 with the opposite ends of the panel 96, and similar connector means serve to connect the inner sides of the filler blocks 120 with the adjacent ends of the panels 84, 88. Connector means 64 also connect the lower ends of the filler blocks 120 with the bed 24.

The structure described above defines the utility trailer 20 having an open upper end, and right-angle irons 121 are detachably secured to the inner corners of the trailer 20 to reinforce the structure and to serve other purposes to be described.

Referring now more specifically to FIGURE 5 of the drawings, reference numeral 122 designates a conventional house trailer, which has been towed by conventional means (not shown) to a temporary home site. In moving to this locale the utility trailer 20 was, in turn towed by the trailer 122 as described above. The house trailer 122 includes a sidewall 124 (see FIGURE 4) in which is fitted the usual ingress and egress door 126.

An elongated substantially rectangular patio 128 (see FIGURE 4), formed of cementitious material or of other desirable rigid materials, is now laid and extends outwardly from the sidewall 124 (see FIGURE 5). The utility trailer 20 is disconnected from the house trailer 122 and the angle irons 121 are removed therefrom and are placed on the patio 128 (see FIGURE 4) adjacent to, but spaced from the outer longitudinal side thereof. Each adjacent pair of angle irons 121 has abutting ends and, as is seen in FIGURE 4 of the drawings, one of the angle irons 121 is turned at right angles with respect to the remaining aligned angle irons 121 and abuts against the outer end of the outermost ones thereof.

Each of the angle irons 121 is formed with patio-engaging foot portion 130 and an inwardly-facing normal upright leg portion 132.

Embedded within the patio 128 are a plurality of internally-threaded sockets 134 having open upper ends opening into the plane of the upper surface of the patio 128. The angle irons 121 are rigidly secured to the patio by means of bolts 136 which extend transversely through the foot portions 130 for threaded engagement with the sockets 134.

The utility trailer 20 is now dismantled by withdrawing all of the pins 76 from the male and female connectors 68 and 72, 74, respectively.

The panel 90 is now set on the foot portion 130 of the angle member 121 which extends at right angles to the aforementioned one of the outermost ones of the angle members 121 and is secured thereto as by bolts 138 which extend through its leg portion 132 and thread into the end frame member 98 thereof. The panel 88 is now set on the foot portion 130 of the outermost one of the aforementioned outermost ones of the angle members 121 and is bolted to its leg portion in the manner described above. Note that the side frame members 94 and 96 of the panels 90 and 88 are juxtaposed and are connected together by the connector means 64. In a similar manner, the intermediate panel 86 is erected and secured to the intermediate angle iron 121 with its side frame member 96 juxtaposed and connected to the side frame member 94 of the panel 86, and finally, the panel 84 is erected as before on the other of the outermost one of the outermost ones of the angle members with its side frame member 96 juxtaposed with respect to the side frame member 94 of the panel 86 and is secured thereto by connector means 64.

It should here be noted that the male connector element 68 and the female connector elements 72, 74 are disposed within their respective associated rabbets 119 in such a manner that a cover or trip strip, to which reference will be made below, may be utilized to conceal the connecting means.

The bed 24 is now towed manually to a point adjacent the panel 84 and the draw tongue 48 is then disconnected therefrom by removing the U-bolts 56, 58. The bed 24 is then upended to rest on its rear end 82 with the end 80 juxtaposed with respect to the side frame member 94 of the panel 84 to which it is detachably connected by connector means 64. The space between the end 78 and that portion of the sidewall 124 which confronts the same is filled in by one of the filler blocks 120, the latter being detachably connected to the sidewall 124 by connector means 64, and the lower ends of the filler blocks 120 are detachably connected to the patio 128 by other angle irons 121.

Reference numerals 140 denote a pair of identical supplemental elongated interchangeable filler blocks of which one of the supplemental filler blocks 140 is inserted between the end 78 of the bed 24 and an adjacent confronting portion of the sidewall 124, the supplemental panel 140 being secured to the sidewall 124 and end 78 by the connector means 64. As seen in FIGURE 4, the above-described one of the supplemental panels 140 is elongated vertically in its installed position with the lower end thereof abutting against the upper end of the aforementioned filler block 120 to which it is secured by connector means 64. The upper end of this supplemental filler block 140 lies in the plane of the upper ends of the end frame members 100 of the panels 84, 86, 88, 90.

The other of the suplemental panels 140 is supported at its lower end on the upper end of the other of the filler panels 120 to which it is detachably connected by connector means 64, and connector means 64 serve to connect this supplemental filler block 140 with the sidewall 124. As is seen in FIGURE 5, this supplemental filler block 140 and its associated filler block 120 have sides 142, 144, respectively, which confront the side frame member 94 of the panel 90 in spaced relation relative thereto, and the upper end of this supplemental filler block lies in the same plane as the upper ends of the end frame members 100 of the panels 84, 86, 88, 90. The intervening space between this filler block 120, the other of the supplemental filler blocks 140 is occupied by a vertically elongated substantially rectangular door 146 having a side thereof detachably connected by connector means 64 with the side 142 of this supplemental filler block 140 and with the side 144 of its associated filler block 120. The other side of the door 146 is provided with the conventional hardware 148.

Reference numerals 150 each denotes a truncated substantially triangular spacer block of which one thereof (see FIGURE 4) has its base end abutting against the sidewall 124 and its altitude side supported on the first-mentioned supplemental filler block 140 and partially across the front end 50 of the bed 24. Connector means 64 detachably connect this triangular truncated spacer block with the sidewall 124 and with the adjacent supplemental filler block 140 and the bed 24. In a similar manner, the other of the truncated triangular spacer blocks 150 has its base abutting against the sidewall 124 and has its altitude side lying across the upper ends of the other of the aforementioned supplemental filler 140, the door 146, and partially across the end frame member 100 of the panel 90, and this spacer block is secured to these elements by connector means 64. The hypotenuse sides 152 (see FIGURE 4) of the truncated triangular spacer blocks 150 are each provided with cut-outs to form a shoulder 154 inclined inwardly and downwardly toward their respective bases and forms a hypotenuse extension side 156 disposed in a plane substantially parallel to the plane of the hypotenuse side 156, but spaced inwardly therefrom.

Abutting against each of the truncated ends of the truncated substantially triangular spacer blocks 150, and detachably connected thereto by connector means 64, is the base end of a substantially triangular spacer block 157. As is seen in the drawings, one of the spacer blocks 157 is connected by connector means 64 to the front end 50 of the bed 24 with its altitude side engaging thereagainst, and extends to the end 80 thereof. The other of the triangular spacer blocks 157 has its base end connected by connector means 64 to the truncated end of the other of the truncated triangular spacer blocks 150 and has its altitude side extending across the remainder of the end frame member 100 of the panel 90. The hypotenuse sides 158 of the trianpular spacer blocks 157 lie in the same plane as the hypotenuse extension sides 156.

Reference numerals 159, 160, 162 (see FIGURE 6) denote U-shaped channel members disposed in alignment with one another with adjacent pairs of ends disposed in abutting relationship. The channel members 159, 160, 162 are identical with the exception of the channel member 159 which is somewhat shorter than the channel members 160, 162. Hence, each of the channel members includes a bight 164 from the longitudinally-extending sides of which project the opposed arms 166, 168. The bights 164 of the channel members 159, 162 seat against the shoulders 154 formed in the two truncated triangular spacer blocks 150 with their respective arms 168 seating against the hypotenuse extension sides thereof, and with the outer sides of their respective other arms 166 lying in the plane of sides 152 of the truncated spacer blocks 150. Any conventional means (not shown) may be employed to secure the bights 164 to the shoulders 154. The adjacent abutting ends of the channel members 159, 160, 162 have their bights 164 connected by links 170 and bolts 172. The truncated triangular spacer members 150 each has a notch 174 formed therein extending inwardly from its base end and opening upwardly into the hypotenuse side thereof.

Extending transversely across the sidewall 124 above the door 126 is an elnogated L-shaped bracket 176 having its leg portion 178 fixedly connected to the sidewall 124 by bolts. This bracket 176 preferably remains permanently attached to the sidewall 124. The foot portion 180 of the bracket 176 projects laterally from the sidewall 124 and terminates in an elongated substantially hollow cylindrical sleeve 182 having an axially formed slot 184 therein.

Intermediate the opposed ends of the cabana or "Florida" room 22 is an L-shaped bracket having a leg portion 186 fixedly secured to the sidewall 124, and a foot portion 188 projecting laterally from the leg portion 186 on which is mounted an upright male coupler element 190. Similar leg and foot portions 186, 188, respectively, the male coupler element 190, taken together with the female connector 52, all form a part of the trailer hitch 54 to which previous reference has been made. The draw tongue 48 is downwardly and outwardly inclined away from the female connector element 52 with its other end engaging against the inner side of the end frame member 100 of the panel 86 (see FIGURE 5) to which it is secured by connector means 64. As is clearly shown in FIGURES 5 and 6, the draw tongue 48 passes beneath the channel member 160, the latter resting thereon, thereby assisting in the support of all of the channel members 159, 160 and 162.

Second L-shaped brackets 191, 192, 194 are provided identical in construction with respect to one another and with respect to the first L-shaped bracket 176, but differ from the latter in that the respective lengths of the former correspond to the lengths of their respective associated channel members 159, 160, 162. Hence, identical reference numerals have been placed against elements of the brackets 191, 192, 194 which have their counterparts in the bracket 176. Bolts 196 connect the leg portions 178 of the brackets 191, 192, 194 to their respective associated bight portions 164 of the channel members 159, 160, 162. Thus, each of the brackets 191, 192, 194 includes a downwardly-inclined foot portion 180, and an elongated substantially hollow cylindrical sleeve 182 slotted axially as at 184.

Reference numerals 198, 200, 202, 204 designate a first or upper set of four identically constructed substantially rectangular roofing sections all having the same dimensions. Reference numerals 206, 208, 210 denote a second or lower set of substantially rectangular roofing panels, identically constructed and wherein the width of the roofing section 206 is greater than the width of either of the roofing sections 208 to 210, the dimensions of the roofing sections 208 and 210 being the same. The two sets of roofing sections being identical in construction, a description of one will suffice as a description of the others.

Thus, and selecting the roofing section 198 for description, the section 198 is seen to have projecting from an end thereof a substantially hollow cylindrical sleeve 212 (see FIGURE 9) connected with the roof section 198 at one end thereof by means of a substantially flat throat portion 214. The roof section 198 is formed with a plurality of laterally-spaced and substantially parallel corrugations 216 which extend from the throat portion 214 to the other end of the roof section, and each end of the roof section 198 is provided with an upright flange 218 including a leg portion 220 and an inwardly-turned arm portion 222. As is seen in the drawings, the arms 222 of the roof section 198 confront one another.

To assemble the roof sections 206, 208, 210 with the cabana structure set forth above, it is only necessary to telescope the hollow cylindrical sleeves 182 of the roof sections 198, 200, 202, 204 in succession, into the cylindrical sleeve 182, in the direction indicated by the arrow in FIGURE 9, in such a manner that the successive throat portions 214 slide through the slot 184. The outer sides of the remotely-disposed roofing sections 198, 204 are supported on the hypotenuse sides 152 of the truncated triangular blocks 150 and on the arms 166 of the channel members, 159, 160, 162 to which they are secured as by bolts 224.

In telescoping the cylindrical sleeves 212 of the roofing sections 200, 202, 204 into the cylindrical sleeve 182 adjacent pairs of leg portions 220 are brought into abutting relation, one with the other (see FIGURE 8) and with the arm portions 222 thereof diverging away from one another. An elongated C-shaped clip 226 is now telescoped over each pair of adjacent flanges 218 and engaged over the arms 222 thereof with the confronting arms 228 of the clip 226 engaging against the remotely-disposed sides of the leg portions 220 to effect a watertight seal between each of the adjacent pairs of flanges 218. In a similar manner the hollow cylindrical sleeves 212 of the roofing sections 206, 208, 210 are telescoped within their respective hollow tubular cylindrical sleeves 182 carried on the brackets 190, 192, 194 with their respective throat portions 214 slidably engaging within the slots 184. The remotely-disposed sides of roofing sections 206, 210 are supported on the hypotenuse extension sides 150 of the truncated triangular filler members 150, and the lower ends of the roofing sections 206, 208, 210 engage over the upper sides of the end frame members 100 of the panels 84, 86, 88 and abut against the arms 230 of a plurality of angle members 232, 234, 236, 238 to which they are secured as by bolts 240 (see FIGURE 7). The angle members 232, 234, 236, 238 also include legs 242 which are secured to the front faces of the tubular end frame members 100 of the panels 84, 86, 88 as by screws 244. The angle members 232, 234, 236, 238 also serve to impart rigidity to the panels 84, 86, 88.

Reference numeral 246 denotes a cabinet formed of a pair of oppositely-disposed spaced, parallel and normally upright trapezoidal sidewalls 248, 250, a topwall 252, and that portion of the bed 24 limned thereby. The upper end 254, 256, respectively, of the sidewalls 248, 250 on which the top wall rests, are downwardly-inclined away from the bed 24, and the top wall and the lower ends of the sidewalls 248 are secured to the angle members 258 (see FIGURE 4) which are, in turn, fixedly secured to the patio. The inner longitudinally-extending sides of the sidewalls 248, 250 have secured thereto male connector elements 68 which mate with the female connector elements 72, 74 connected to the underside of the bed 24 to form the detachable connectors 64, and the inner marginal edge of the top wall 252 has secured thereto a pair of female connector elements 72, 74 which cooperate with the pair of male connector elements 68 connected to the underside of the bed 24.

Still other connector elements 64 hingedly connect the outer edges of the sidewalls 248, 250 with the inner sides of a pair of substantially rectangular cabinet doors 260, 262, respectively, and the outer sides of the doors 260, 262 adjacent their other edges have affixed thereto handles 264. One of the doors 260 or 262 may be provided with a hasp 266 which cooperates with a staple 268 on the other of the doors, the staple being adapted to receive locking means (not shown).

The cabinet 246, as illustrated in FIGURE 4 encloses the wheels 44, 46, and may be employed to house utensils of various kinds.

When it becomes necessary to find a new site, the cabana or "Florida" room 22 may be quickly dismantled by removing the roofing sections 198, 200, 202, 204 after removing the bolts 224. The roofing sections 206, 218, 210 may then be removed after having first removed the bolts 240. Thereafter, the remaining connected elements are disconnected from one another. The tongue 48 is reconnected with the bed 24 and is turned to its normal horizontal position to receive thereon the panels 84, 86, 88, 90 and the filler blocks 150 in the manner described. All of the remaining elements of this invention are now stowed in the utility trailer 22 with the exception of the patio 128 and the roof section 206. The latter is as long and as wide as the bed 24 and rests on the upper sides of the panels 84, 86, 88, 90 and on the filler blocks 150 to which it is detachably connected by connectors 64.

FIGURES 11, 12 and 13 disclose a modification of this invention wherein the longitudinally extending corners of the side frame members 94, 96 of the panels 84, 86 are undercut as at 119' to receive the male hinge element 68 and the female hinge elements 72, 74. Slidably inserted within the undercuts 119' which, when brought into juxtaposition form a dovetail slot, are the dovetail flanges 300 of an elongated substantially C-shaped trim strip as seen in these figures. The flanges 300 diverge away from one another and are integral with the free ends of the arms 304. With the trim strip 302 inserted within the undercut slots 119', the bight portion 306 overlies the hinge elements and extends beyond the longitudinally extending sides of the undercut grooves 119' to effectively conceal the same.

Having described and illustrated one embodiment of this invention, it will be understood that the same is offered merely by way of example, and that this invention is to be limited only by the score of the appended claims.

What is claimed is:

1. An elongated substantially rectangular cabana or room, said cabana comprising an elongated substantially rectangular stationary patio, a pair of laterally-spaced horizontally-elongated normally upright substantially rectangular sidewalls and a pair of longitudinally-spaced normally upright substantially rectangular end walls, said end walls projecting laterally from the remotely-disposed ends of one of said sidewalls and engaging against the other of said sidewalls intermediate the ends thereof, said end walls each having an upper end inclined downwardly from said other of said sidewalls toward the upper end of said one of said sidewalls, means detachably connecting the remotely-disposed sides, respectively, of said one of said sidewalls with the adjacent sides of said end walls, means detachably connecting said other of said sidewalls with, respectively, the other adjacent sides of said end walls, means detachably connecting the lower end of said one sidewall and the lower ends of said end walls to said patio, an elongated substantially rectangular roof extending across and being supported on said upper ends of said end walls and on the upper ends of said one sidewall, means detachably connecting said roof with said upper end of said one sidewall, means projecting laterally from the other of said sidewalls detachably connecting said roof thereon, and ingress and egress means disposed in said other of said side walls.

2. A cabana or room as defined in claim 1, wherein said other of said sidewalls comprises a sidewall of a house trailer.

3. A cabana or room as defined in claim 2, wherein said one side wall comprises a plurality of vertically-elongated substantially rectangular identical first panels disposed in longitudinally-aligned side-by-side relation relative to one another, means detachably connecting adjacent pairs of sides of said panels, and wherein said end walls project laterally from the remotely-disposed sides of the outermost ones of said panels.

4. A cabana or room as defined in claim 3, wherein one of said end walls includes a second panel identical in construction with respect to said first panels.

5. A cabana or room as defined in claim 4, wherein said one of said end walls includes a vertically-elongated normally upright substantially rectangular first filler block having a side thereof disposed in confronting spaced relation relative to a side of said second panel, a vertically-elongated normally upright substantially rectangular second filler block having its lower end mounted on the upper end of said first filler block and having a side thereof disposed in spaced and confronting relation relative to said side of said second panel, means detachably connecting the lower end of said second filler block with the upper end of said first filler block, means detachably securing the opposite sides of said first and second filler blocks on said sidewall of said house trailer, a substantially triangular spacer element spanning the upper ends of said second panel and said second filler block, said element engaging under and supporting one end of said roof.

6. A cabana or room as defined in claim 5, wherein the other of said end walls includes a horizontally-elongated substantially rectangular member having an upper end flush with the upper ends of said panels and having a side thereof disposed in spaced confronting relation relative to said sidewall of said house trailer, a vertically-elongated normally upright substantially rectangular third filler block identical to said first filler block, said third filler block being interposed between said last-named sidewall and said side of said rectangular member, a vertically-elongated substantially rectangular fourth filler block identical to said second filler block, said fourth filler block being mounted on said third filler block with its lower end engaging the upper end of said fourth filler block, means detachably connecting the adjacent upper and lower ends of said supplemental filler block and said second filler block, third and fourth filler blocks, respectively, means detachably connecting the opposite sides of said third and fourth filler blocks with said sidewall of said house trailer and with the adjacent side of said rectangular member, and a second substantially triangular element spanning the upper end of said fourth filler block and the upper end of said rectangular member and being detachably connected thereto, said triangular element engaging under and supporting the other end of said roof.

7. A cabana or room as defined in claim 6, wherein reinforcing and bracing means extend across the upper ends of said panels forming said one sidewall, and means detachably connecting said roof to said reinforcing and bracing means.

8. A cabana or room as defined in claim 7, wherein said triangular elements each comprises a truncated triangular spacer block having an upwardly-facing hypotenuse side, said hypotenuse side of each of said truncated triangular spaced blocks having a cut-out formed therein to form a downwardly and inwardly-inclined shoulder intermediate the ends of said hypotenuse side, a hypotenuse extension side, hypotenuse extension side being vertically-spaced below said hypotenuse side and being parallel therewith, a substantially triangular spacer block having the base end thereof abutting against the truncated end of said substantially truncated triangular spacer block and its hypotenuse side disposed in the plane of the hypotenuse extension side of said truncated triagular spacer block, a plurality of substantially U-shaped channel members, said U-shaped channel members being disposed in end-to-end abutting aligned relation, said channel members each having a bight and a pair of arms projecting laterally from the opposed longitudinal-extending sides of said bight, means detachably connecting each adjacent pair of ends of said U-shaped channel members, a plurality of substantially L-shaped bracket members, each of said bracket members including a leg portion fixedly secured to the bights, respectively, of one of said L-shaped brackets, the foot portion of each of said L-shaped brackets projecting laterally from said leg portion thereof and terminating in a substantially hollow cylindrical sleeve, each of said sleeves having an axially-extending slot therein, said means projecting laterally from the other of said sidewalls comprising a second substantially L-shaped bracket having an elongated leg portion fixedly secured to said other of said sidewalls, said last-named L-shaped bracket having an elongated foot portion projecting laterally from said leg portion and terminating in a substantially hollow tubular sleeve, said sleeve having an axially-extending slot extending transversely therethrough, said roof comprising first and second sets of substantially rectangular roof sections with said roof sections of each set thereof being disposed in end-to-end abutting relation, said first set of roof sections having a side thereof terminating in a substantially hollow cylindrical sleeve, each of said last-named sleeves being connected to its associated roof section by a substantially flat throat, said hollow tubular sleeves of said first set of roof sections being telescoped within said first of said L-shaped bracket members with the throats thereof slidably engaging within said slot of said first L-shaped bracket member, the other sides of said first set of roof sections being fixedly secured to said reinforcing and bracing means connected to the upper ends of each adjacent pair of said panels of said first sidewall, said second set of roof sections having a side thereof terminating in a substantially hollow tubular cylindrical sleeve, said hollow tubular cylindrical sleeves of said second set of said roof sections being connected to said roof sections by a substantially flat throat, said last-named substantially hollow tubular cylindrical sleeves being telescoped within said last-named hollow cylindrical sleeve of said second L-shaped bracket with said last-named throat slidably engaging within said axially-extending slot formed in said last-named hollow tubular sleeve, and means detachably connecting the other sides of said second set of roof sections with an arm of said U-shaped channel member.

9. A room of the character described adapted to be converted into a trailer without added parts, said room including a horizontally-elongated substantially rectangular member forming a part of the first end wall of said room and having a wheel assembly mounted thereon, said rectangular member movable into a horizontal position and being supported in said position on said wheels to form the bed of a trailer, said room having a second end wall oppositely disposed with respect to said first end wall, said second end wall including as a part thereof a vertically elongated substantially rectangular panel having oppositely disposed sides and ends, a sidewall for said room including a plurality of vertically elongated substantially rectangular panels, all of said panels being disposed in side-by-side abutting relationship, means on each of the sides of said panels detachably connecting adjacent pairs thereof, said panels being movable from the vertically elongated position to a horizontally elongated position with an elongated side of each panel resting on, respectively, the upper side of said bed at each of its sides and ends and adjacent the peripheral marginal edge of said bed, means on said peripheral marginal edge of said bed cooperating with means on said sides of all of said panels to detachably connect all of said panels with said bed, a second sidewall oppositely disposed with respect to said first sidewall, reinforcing means extending between and detachably connected to said sidewalls intermediate said end walls, said reinforcing means being removable from said sidewalls for engagement with the underside of said bed to form a draw tongue for a trailer, and means detachably connecting said draw tongue with said bed.

10. A room of the character described adapted to be converted into a trailer without added parts, said room comprising a horizontally elongated substantially rectangular member forming a part of a first end wall of said room and having a wheel assembly mounted thereon, said rectangular member being movable into a horizontal position and being supported in said position on said wheels to form the bed of a trailer, said room having a second end wall oppositely disposed with respect to said first end wall, said second end wall including as a part thereof a vertically-elongated substantially rectangular panel having oppositely-disposed sides and ends, a first sidewall for said room including a plurality of vertically-elongated substantially rectangular panels, all of said panels being disposed in side-by-side abutting relationship, means on each of the sides of said panels detachably connecting adjacent pairs thereof, said panels being movable from their said vertically-elongated position to a horizontally-elongated position with an elongated side of each panel resting on, respectively, the upper side of said bed at each of its sides and ends and adjacent the peripheral marginal edge of said bed, means on the peripheral marginal edge of said bed cooperating with said means on said sides of all of said panels to detachably connect all of said panels with said bed, said room including a second sidewall, roof support and reinforcing means extending between and detachably connected to said sidewalls intermediate said end walls, said roof support and reinforcing means being removable from said sidewalls for engagement with the underside of said bed to form a draw tongue for a trailer, and means detachably securing said draw tongue with said bed.

11. A room of the character described adapted to be converted into a trailer without added parts as defined in claim 10, wherein said room includes a plurality of elongated substantially rectangular roof sections detachably connected together and to the upper end portions of said side and end walls when disposed in their respective vertically-elongated positions, one of said roof sections being removable from the upper ends of said side and end walls for superimposition on the upper sides of said panels when disposed in their said horizontally-elongated positions, said roof section being disposed in a substantially horizontal plane, and means detachably connecting said roof section with said upper sides of said panels.

12. A room of the character described adapted to be converted into a trailer without added parts and as defined in claim 11, and detachable connecting means for connecting adjacent pairs of ends of said panels.

13. A room of the character described adapted to be converted into a trailer without added parts and as defined in claim 12, and wherein each of said end walls includes a vertically-elongated substantially rectangular filler block, said filler blocks being removable from said end walls into vertically-elongated upright positions on said bed, said filler blocks being interposed between a pair of adjacent ends of a pair of oppositely-disposed panels and the opposite ends of one of said panels disposed adjacent thereto when said panels are in their respective horizontally-elongated positions, and means detachably connecting said filler blocks with said bed, said adjacent ends of said pair of oppositely-disposed panels, said one panel having opposed ends, and with said roof section when said last-named pair and one panel are disposed in their said horizontally-elongated positions.

References Cited by the Examiner

UNITED STATES PATENTS

| | | | |
|---|---|---|---|
| 2,259,783 | 10/1941 | Sparling | 296—23 X |
| 2,293,569 | 8/1942 | Sonino | 296—23 X |
| 3,131,001 | 4/1964 | Meyer | 296—27 |

FOREIGN PATENTS

| | | |
|---|---|---|
| 679,675 | 8/1962 | Canada. |
| 807,774 | 1/1959 | Great Britain. |

BENJAMIN HERSH, *Primary Examiner.*

P. GOODMAN, *Assistant Examiner.*